Patented Feb. 24, 1953

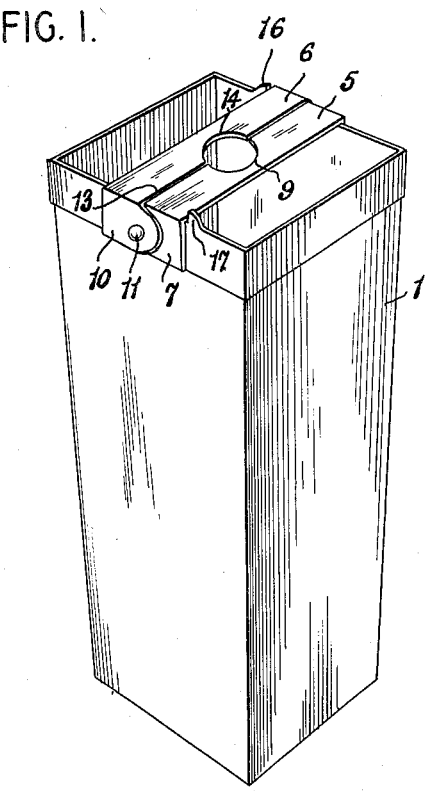
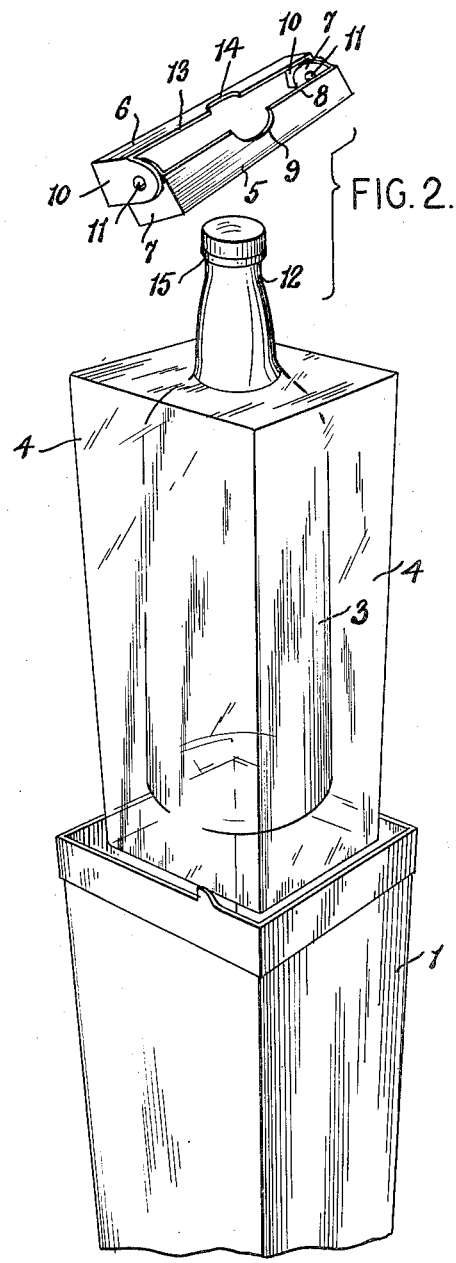
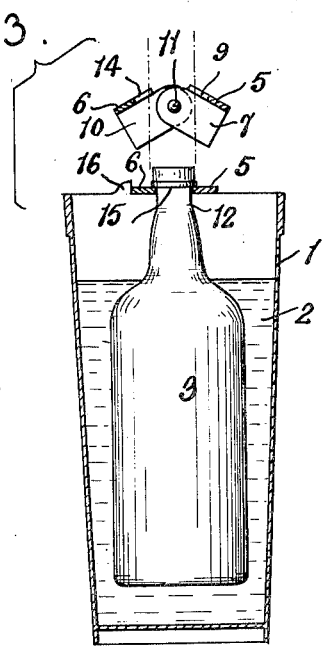

2,629,515

UNITED STATES PATENT OFFICE 2,629,515

BOTTLE SUSPENSION DEVICE FOR FREEZING MOLDS

Ragnar Asplund, Astoria, N. Y.

Application June 1, 1951, Serial No. 229,418

3 Claims. (Cl. 220—85)

This invention relates to bottle holders, and more particularly to a type by means of which a bottle is held in a suspended position in a water-filled receptacle or mold to permit the water in the mold to freeze and form a block of ice around the bottle.

Before serving certain liquors, such as aquavitae, the bottle is placed in a water-filled receptacle or mold, and the water contents of the mold are then frozen to form a block of ice around the bottle, which, with the block of ice around it, is lifted from the mold and served. It is an object of the present invention to provide a suspension means removably fitted about the bottle neck, which will effectively support the bottle within the mold, with the bottom of the bottle in an elevated position above the bottom of the mold to facilitate the freezing of the water all around the bottle and particularly below the bottom of the same.

It is a further object of the invention to provide such suspension means which will hold the bottle firmly and securely in a suspended position in the receptacle or mold, yet can be quickly freed from the bottle when the bottle and its encasing block of ice is removed from the mold. Another object of the invention is to provide a bottle-suspension means which will hold the bottle securely, yet allow sufficient latitude of movement of the bottle to permit of expansion of the water in freezing.

More particularly, the invention contemplates the provision of a pair of pivotally connected bars or jaws having flanged ends by which their pivotal connection is attained and having notches in adjacent edges cooperating to form a bottle-neck opening through which the neck of the bottle is extended. The neck of the bottle is embraced between the cooperating notches, and the bars, bridging the top of the receptacle or mold, hold the bottle suspended within the mold, with the bottom of the bottle elevated above the bottom of the mold.

These and other objects to be hereinafter set forth, are attained by the invention, a more particular description of which will appear below and be set forth in the claims appended hereto.

In the accompanying drawing, wherein an illustrative embodiment of the invention is disclosed, Fig. 1 is a perspective view of a bottle receptacle or mold, with the improved suspension means arranged at the top thereof;

Fig. 2 is a perspective view, showing the ice-encased bottle elevated out of the receptacle or mold and the suspension device or bottle holder in an open position and released from its engagement with the bottle neck; and Fig. 3 is a vertical sectional view through the receptacle or mold, showing a bottle in position in the water in the mold, and indicating the manner in which the suspension member is fitted on the neck of the bottle.

Referring to the drawing, 1 indicates a receptacle or mold within which the bottle is adapted to be placed to have a block of ice frozen around it. The receptacle or mold 1 may be of any suitable material, such as stainless steel or other metal, and tapers or decreases in size toward its bottom to facilitate the removal of the ice block as shown in Fig. 2. The water placed within the receptacle is shown at 2 and the block of ice which it forms around the bottle 3, and which conforms in shape to the interior shape of the mold 1, is indicated at 4.

The suspension device comprises a pair of bars or jaws indicated respectively at 5 and 6. At its opposite ends, the bar 5 is downturned to provide the flanges 7. The inner longitudinal edge 8 of the bar 5 is provided with a semi-circular notch 9. The bar 6 is similar in construction to the bar 5, and has end flanges 10 which overlap the end flanges 7 and are pivotally attached thereto by the rivets 11. Through this pivotal connection between the two bars 5 and 6 a swinging movement of the bars relatively to one another, and as shown in Figs. 2 and 3, may be had to open the bars and permit either the entry of the neck 12 of the bottle between the notches or to permit the detachment of the holder from the bottle neck.

The bar 6 has its longitudinal edge 13 formed with the notch 14 which corresponds in shape and size to the notch 9 in edge 8 of the bar 5.

From the construction heretofore described, it will be apparent that the two pivotally connected bars 5 and 6 constitute a pair of gripping jaws between which the neck of the bottle is engaged. The circular opening defined by the two cooperating notches 9 and 14 is of a diameter to enable it to somewhat loosely fit around the neck of the bottle just below the bead 15 formed on either the bottle neck or on the bottle cap, so that when the bars 5 and 6 are in their closed position, as shown in Figs. 1 and 3, the bottle will be engaged by the holder just below the bead 15 and held suspended in the receptacle or mold, with the bottom of the bottle elevated above the bottom of the receptacle to thereby permit the water 2 to freeze below the bottom of the bottle. The opening defined by the two notches 9 and 14 is of a size to prevent downward passage of the bead 15 therethrough yet is large enough to permit a slight raising movement of the bottle during freezing and expansion of the water.

The holder is fitted across the top of the receptacle or mold as shown in Fig. 1 and when so fitted, and the bars or jaws 5 and 6 are closed or held flatly, the holder will then be confined between the upstanding lugs 16 and 17 provided at the top of the opposite side walls of the mold. This holds the device centrally of the mold and assures a central position for the bottle while the water is being frozen around it.

In removing the bottle from the receptacle or mold, with the ice block frozen around it, as shown in Fig. 2, the holder may be used as a lifting means or handle to enable the bottle to be easily elevated. Thereafter, when the ice-encased bottle has been elevated out of the mold, the holder is readily slipped from the top of the bottle by pivotally swinging the bars 5 and 6 apart, or opening the device as shown in Fig. 2 and in the upper portion of Fig. 3. The device is also readily placed in position while the jaws are open, and then the jaws are closed, and the bottle will be held by suspension in the mold as heretofore explained.

Having described one embodiment of the invention, it is obvious that the same is not to be restricted thereto, but is broad enough to cover all structures coming within the scope of the annexed claims.

What I claim is:

1. A bottle support comprising, a pair of parallel bars having opposed edges, each edge being provided with a notch, the two notches forming a circular aperture adapted to encircle the neck of a bottle and hold said bottle by engagement below the cap of the bottle, and end flanges on the bars pivotally connected together and permitting the bars to be pivotally separated to thereby enlarge the aperture defined by the notches and permit removal of the support from the neck of the bottle.

2. A bottle holder adapted to extend across the top of a freezing mold, said holder comprising a pair of elongated bars having meeting opposing, longitudinal edges, each of said edges being provided with a semi-circular notch, the two notches cooperating in forming a circular opening to fit around a bottle neck below the bottle cap and hold the bottle suspended in the mold, the bars having end flanges pivotally connected together to enable the bars to be swung apart to separate said opposing edges and thus enlarge the size of the opening defined by the notches.

3. A bottle support comprising a mold for forming a block of ice around a bottle, said mold being provided on its upper edge with spaced lugs, a bottle-suspension device adapted to bridge the top of the mold and be centrally positioned by means of said lugs, said bottle suspension device comprising a pair of bars having opposed edges each provided with a notch to define a circular opening between them, said opening fitting around a bottle neck below the cap thereon and holding the bottle suspended in the mold with the bottom of the bottle elevated above the bottom of the mold, each bar having an angularly bent flange at each of its ends, the flanges on one bar overlapping those of the other bar and being pivotally connected thereto, the bars being capable of pivotal movement to separate the notched opposing edges and thereby increase the size of the circular opening defined by the notches and permit the bottle neck to be passed through said enlarged opening.

RAGNAR ASPLUND.

REFERENCES CITED

The following references are of record in the file of this patent:

UNITED STATES PATENTS

| Number | Name | Date |
| --- | --- | --- |
| 1,179,725 | Iversen | Apr. 18, 1916 |
| 1,256,583 | Meatyward | Feb. 19, 1918 |
| 1,411,695 | Hackett | Apr. 4, 1922 |